(12) United States Patent
Bernini

(10) Patent No.: US 8,600,582 B2
(45) Date of Patent: Dec. 3, 2013

(54) APPARATUS FOR CUTTING GRASS

(76) Inventor: Fabrizio Bernini, Bucine (IT)

( * ) Notice: Subject to any disclaimer, the term of this patent is extended or adjusted under 35 U.S.C. 154(b) by 0 days.

(21) Appl. No.: 13/482,224

(22) Filed: May 29, 2012

(65) Prior Publication Data

US 2013/0018527 A1   Jan. 17, 2013

(30) Foreign Application Priority Data

Jul. 14, 2011  (EP) .................................. 11425189

(51) Int. Cl.
*B60K 31/00*   (2006.01)

(52) U.S. Cl.
USPC .............................................. 701/2; 700/258

(58) Field of Classification Search
USPC .............................................. 701/2; 700/258
See application file for complete search history.

(56) References Cited

U.S. PATENT DOCUMENTS

| 2005/0230166 A1* | 10/2005 | Petersson et al. ............. 180/170 |
| 2008/0097645 A1* | 4/2008 | Abramson et al. ............. 700/258 |

FOREIGN PATENT DOCUMENTS

| EP | 1 906 205 A1 | 4/2008 |
| WO | 03/104908 A1 | 12/2003 |
| WO | 2010/077198 A1 | 7/2010 |

* cited by examiner

*Primary Examiner* — Mary Cheung
*Assistant Examiner* — Yuen Wong
(74) *Attorney, Agent, or Firm* — Lucas & Mercanti, LLP

(57) ABSTRACT

The invention describes an apparatus for cutting grass comprising a lawn mower, predisposed to operate at least within a cutting area (A) delimited by a perimeter cable; a management device, suitable for propagating an electrical signal (S) through the perimeter cable; operative modules, suitable for checking the position of the lawn mower with respect to the perimeter cable; a command unit suitable for commanding a movement of the lawn mower based on the position of the lawn mower with respect to the perimeter cable.

11 Claims, 4 Drawing Sheets

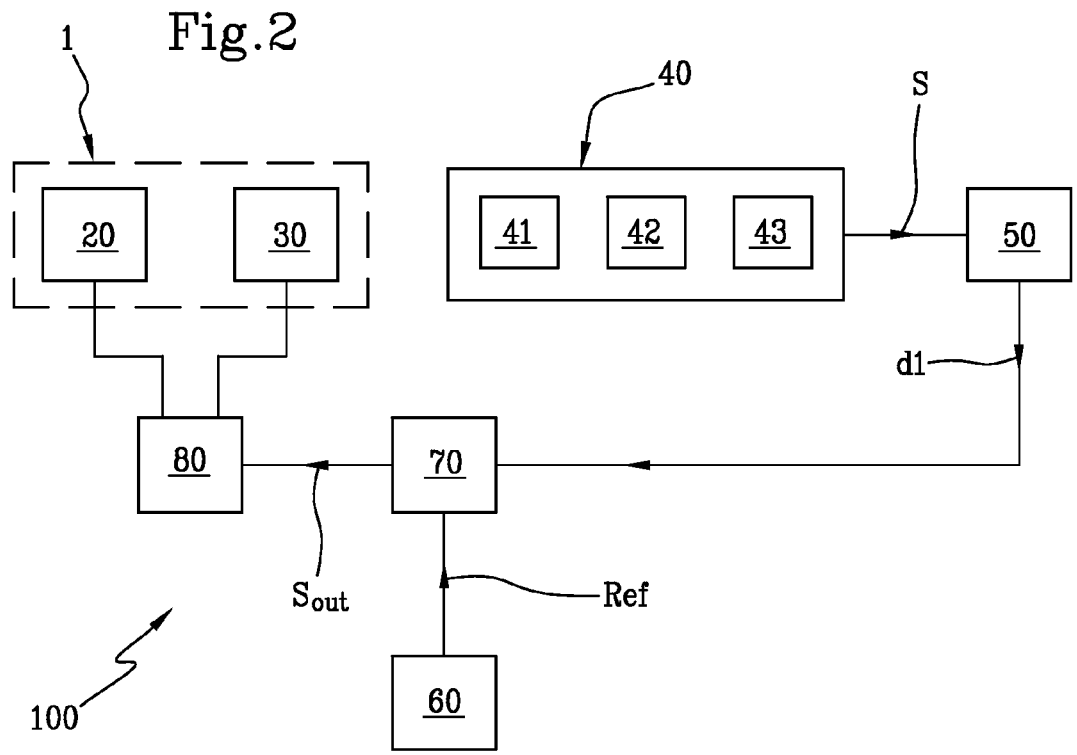
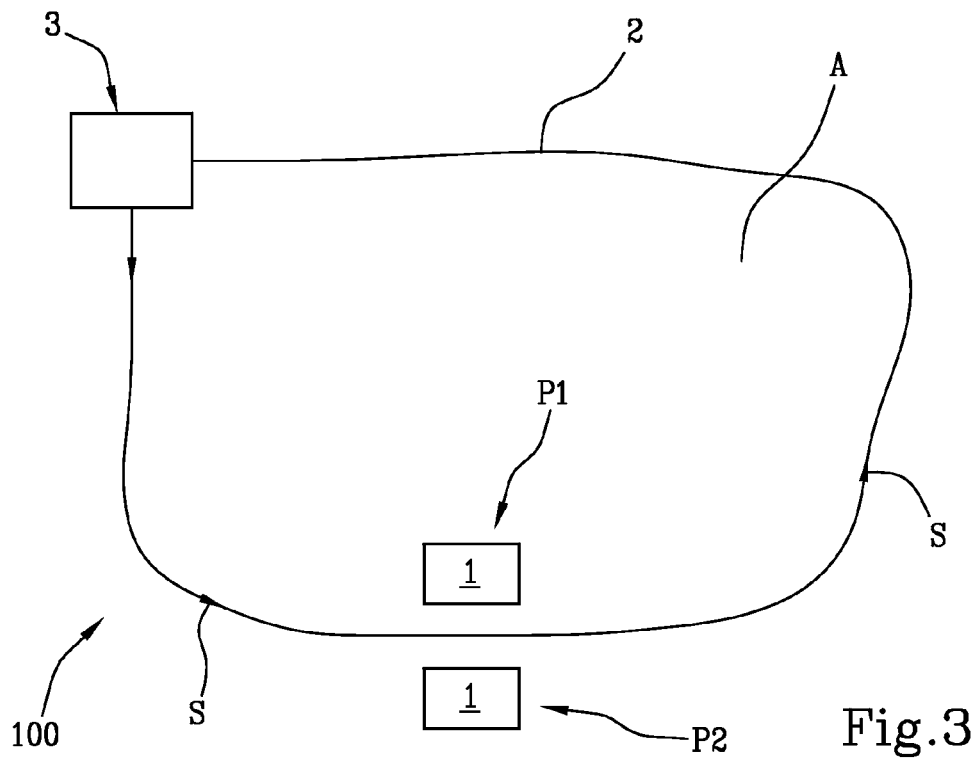

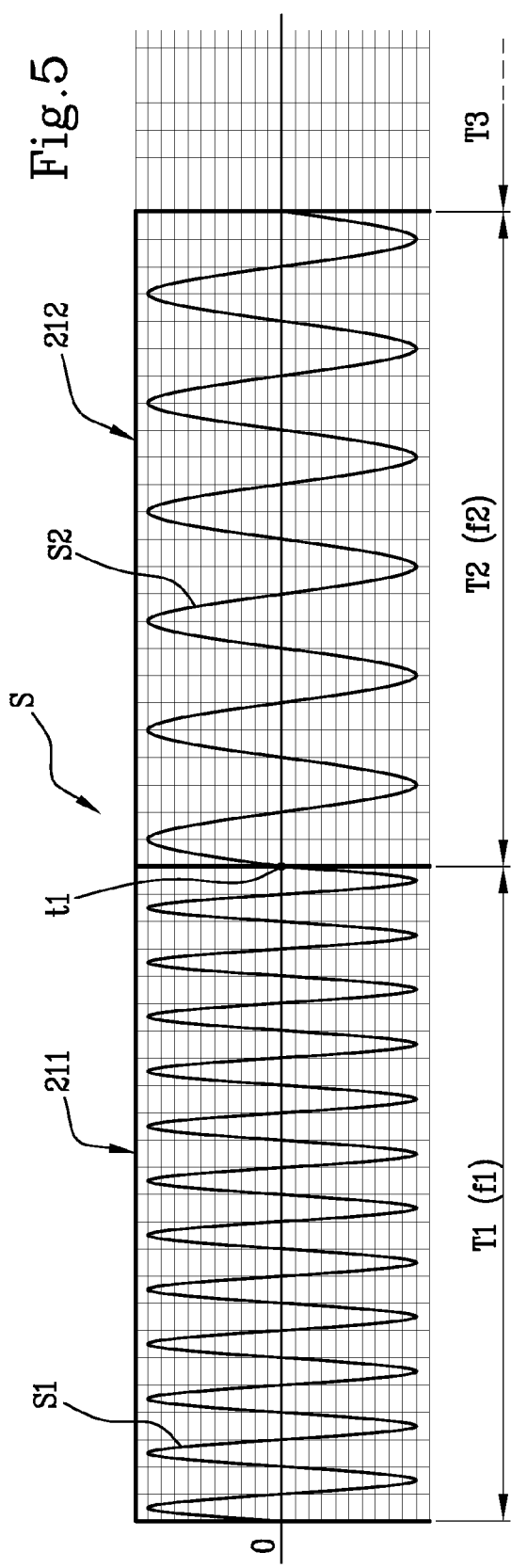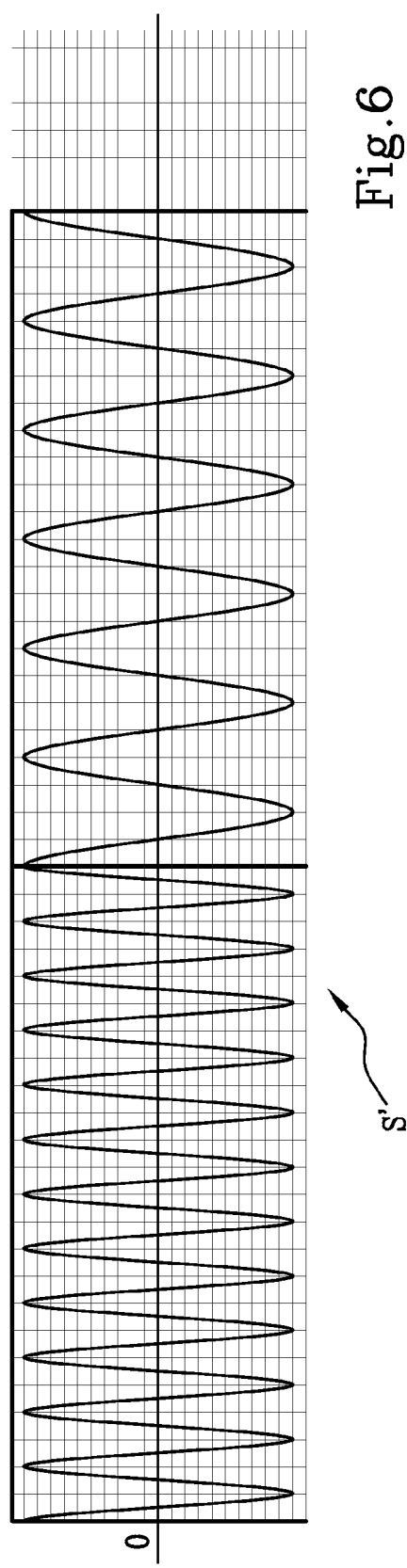

APPARATUS FOR CUTTING GRASS

CROSS-REFERENCE TO RELATED APPLICATION

This Application claims the benefit of priority from European Patent Application No. 11425189.5, filed Jul. 14, 2011, the contents of which are incorporated herein by reference.

FIELD OF THE INVENTION

The present invention relates to an apparatus for cutting grass. Specifically, the present invention relates to an apparatus for cutting grass predisposed to operate within predetermined cutting areas.

BACKGROUND OF THE INVENTION

As is well known, lawn mowers are utilized to keep lawns, gardens and grassy areas in general, in optimal condition, that is, to keep the grass below a certain height in a substantially homogenous manner throughout the entire cutting area.

The cutting area is often delimited by a perimeter wire or cable, in which an electrical signal is propagated; the lawn mower, detecting this electrical signal, is capable of recognizing its own (internal/external) position with respect to the cutting area, and adjusts its movement accordingly.

A first solution made available by the prior art foresees that the electrical signal in the perimeter cable has a mono-frequency sinusoidal waveform.

When starting operation, the lawn mower is synchronized with the management device, that is, the device that provides for the generation of the electrical signal cited, and stores a representative reference value of this sinusoidal signal.

During operation, the lawn mower detects, by means of suitable sensor means, the signal propagated in the perimeter cable, and compares the signal detected with the reference value stored previously in the memory.

If the two signals match, the lawn mower "understands" that it is within the cutting area; vice versa, if the two signals differ, the lawn mower recognizes that its position is outside of the cutting area. In both cases, the information obtained is useful for regulating the movement and/or cutting operations of the lawn mower itself.

The main drawback of this first configuration emerges with regard to the system's energy consumption. In fact, propagation of the electrical signal is substantially continuous, actually resulting in levels of energy consumption that are not negligible.

A second prior-art solution consists in the utilization of a current signal having at least two different harmonic components.

During operation, the lawn mower detects this signal, separates the two harmonic components and based on the latter, it determines whether it is inside or outside the cutting area.

In this case as well, the information is then utilized to control the execution of movement and/or cutting operations on the part of the lawn mower.

The main drawback related to this second solution consists in the fact that it involves a complicated technique, which requires the presence of complex and costly circuits on board the lawn mower.

Moreover, a further drawback is related to the generation of harmonics, which, as is known, create interference affecting other machines in the vicinity of the work area.

The aim of the present invention is to make available an apparatus for cutting grass in which the lawn mower is able to determine in a simple and reliable manner its (internal/external) position with respect to the cutting area.

An additional aim of the present invention is to make available an apparatus for cutting grass in which the lawn mower is able to regulate its own movement and the cutting operations in a simple and reliable manner.

An additional aim of the present invention is to make available an apparatus for cutting grass in which the lawn mower is capable of operating in a correct and efficient manner, and, at the same time, has a simple and economical electronic structure.

A further aim is to make available an apparatus for cutting grass that is capable, during operation, of not causing interference affecting other machines located in the vicinity of the work area.

SUMMARY OF THE INVENTION

These and still other aims are substantially achieved by an apparatus for cutting grass according to that which is described in the accompanying claims.

The apparatus, according to the invention, achieves the following main technical effects:
  simple and reliable determination of its own (internal/external) position with respect to the cutting area;
  regulation of its own movement and of the cutting operations in a simple and reliable manner;
  correct and efficient operation;
  a simple and economical electronic structure; and
  absence of interference affecting other machines located in the vicinity of the work area.

The technical effects cited and other technical effects of the invention will emerge in more detail from the description, provided herein below, of examples of embodiments provided by way of non-limiting examples with reference to the attached drawings.

BRIEF DESCRIPTION OF THE DRAWINGS

FIGS. 2 and 3 are block diagrams of the apparatus according to the invention;

FIG. 5 shows a detailed representation of the signals appearing in FIG. 4; and FIG. 6 shows signals derived from the signals appearing in FIG. 5.

DETAILED DESCRIPTION OF THE INVENTION

The apparatus for cutting grass comprises a lawn mower, predisposed to operate at least within a cutting area S delimited by a perimeter cable; a management device suitable for propagating an electrical signal through the perimeter cable; operative modules, suitable for checking the position of the lawn mower with respect to the perimeter cable; a command unit suitable for commanding a movement of the lawn mower based on the position of the lawn mower with respect to the perimeter cable.

With reference to the accompanying figures, "100" is used as an overall indication of an apparatus for cutting grass according to the invention.

The apparatus 100 comprises a lawn mower 1, predisposed to operate at least within a cutting area A delimited by a perimeter cable 2.

Figure 1:
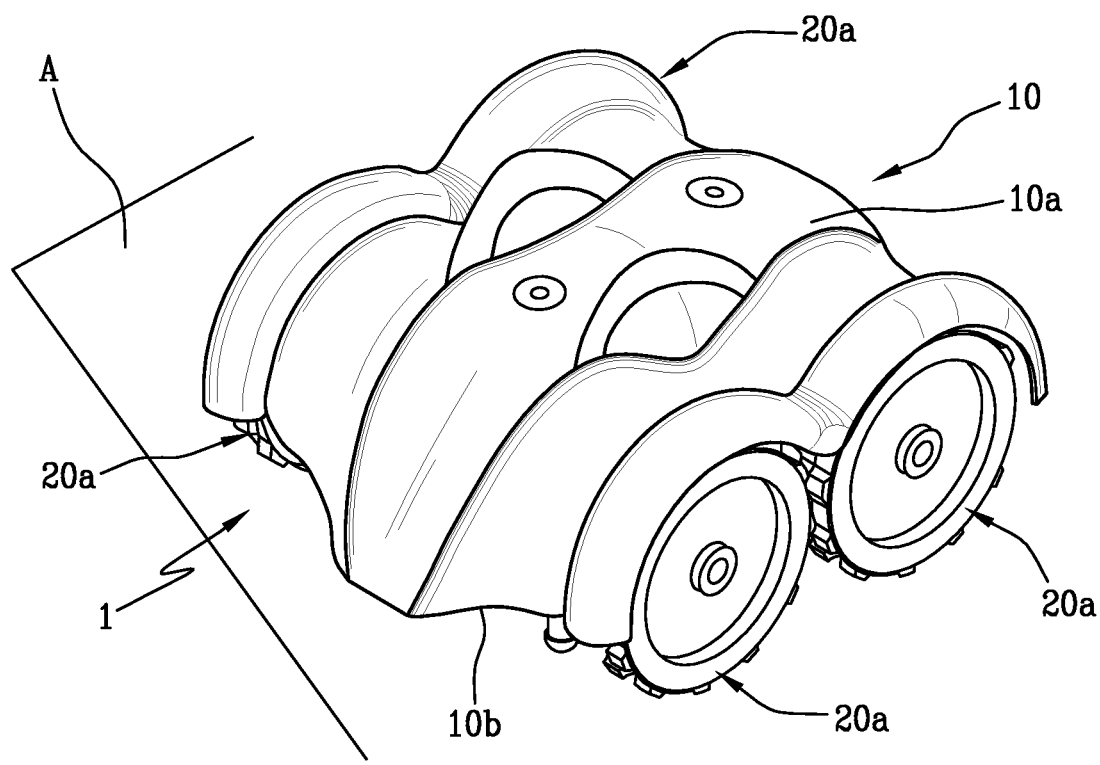
FIG. 1 shows a schematic perspective view of a lawn mower, which is part of the apparatus according to the present invention.

The lawn mower 1 (FIG. 1) comprises above all a frame 10; the frame 10 can comprise, for example, an upper body 10a and a lower body 10b, preferably removably associated to one another.

The upper body 10a and the lower body 10b can be realized, for example, in plastic material.

The lawn mower 1 further comprises movement means 20 mounted on the frame 10 to move the lawn mower 1 with respect to a work surface or cutting area A; the latter may consist of a lawn, a garden, a flowerbed, or in general any surface on which the lawn mower 1 is required to operate.

The movement means 20 preferably comprises a plurality of wheels 20a, assembled on the frame 10, and one or more motors, predisposed for the rotating movement of said wheels 20a.

By way of example, the lawn mower 1 shown in the accompanying figures is provided with four wheels 20a, which are appropriately motorized.

The lawn mower 1 further comprises one or more blades 30 (schematically shown in FIG. 1), assembled on the frame 10, to cut the grass existing on the work surface A.

Advantageously, the blades 30 are driven by suitable motors, which are housed inside the frame 10.

By way of example, the motors cited may be electric motors, powered by a battery; the battery may be of a rechargeable type. Preferably, recharging, which takes place at a docking station or recharging base, is obtained through electrical coupling, particularly of an inductive type. Preferably, the battery cited can also supply power to a control unit (which will be described herein below), and other electrical/electronic devices provided on board the lawn mower 1.

The apparatus 100 further comprises a management device 3 (FIG. 3) associated to the perimeter cable 2 cited.

The management device 3 is configured to supply an output electrical signal S, comprising a plurality of primary pulses 210.

Figure 4:
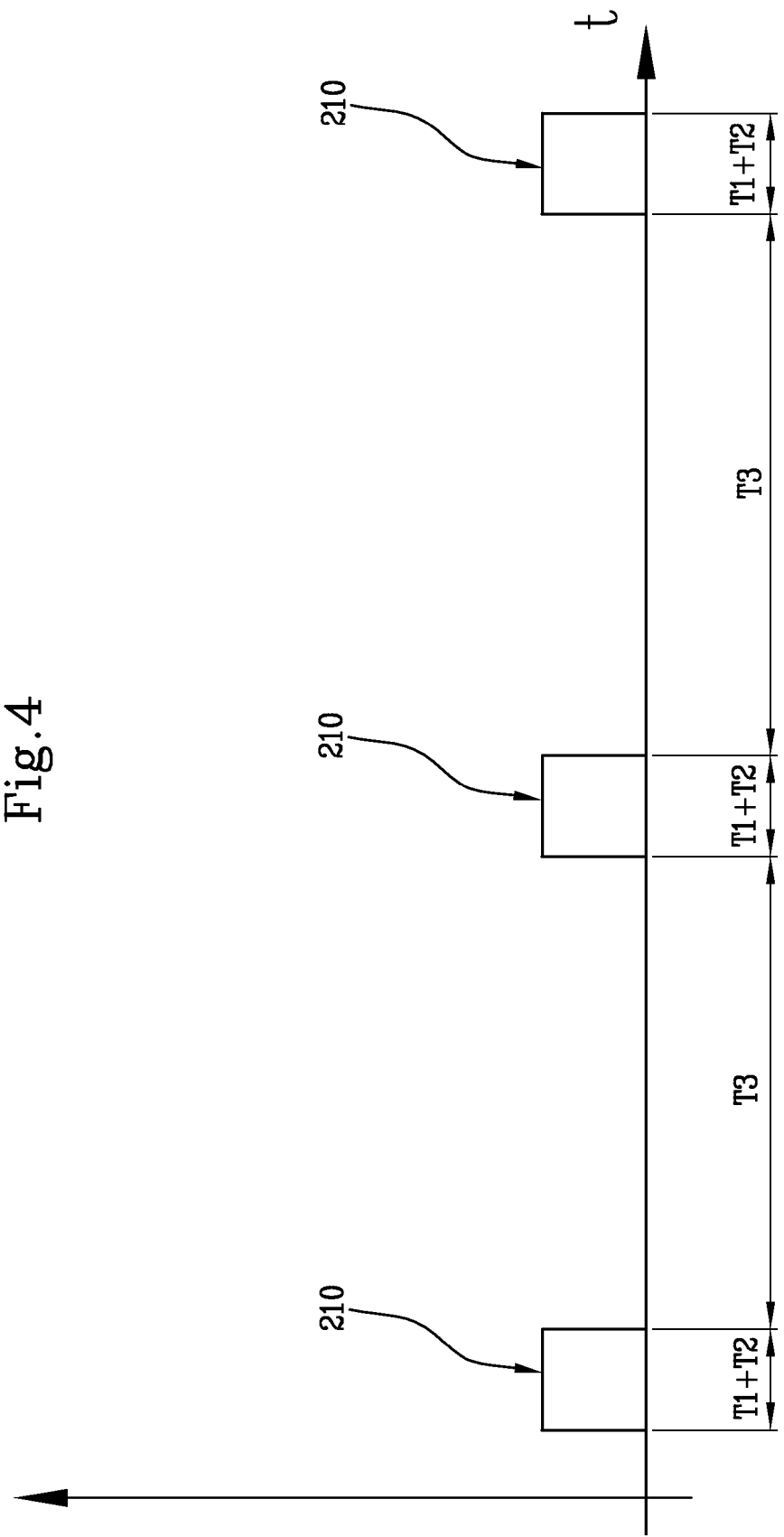
FIG. 4 shows signals utilized in the apparatus of the invention.

According to the invention, the primary pulses 210 are spaced apart from each other (FIG. 4).

Preferably, the separation interval between them is much greater than the period of the primary pulses 210.

The technical effect achieved consists of energy savings combined with lower operating costs.

According to the invention, the primary pulses 210 consist of (FIG. 5):
a first, substantially periodic portion S1 of a first period T1 and first frequency f1; and
a second, substantially periodic portion S2 of a second period T2 and second frequency f2.

More specifically, as shown in FIG. 5, the first portion S1 can represent a signal at the first frequency f1 comprised between 7.5 KHz and 8.5 KHz, preferably 8 KHz.

The first period T1 can be comprised between circa 1.5 ms e 2.5 ms, preferably 2 ms.

More specifically, as shown in FIG. 5, the second portion S2 can represent a signal at the second frequency f2 comprised between 3.5 KHz and 4.5 KHz, preferably 4 KHz.

The second period T2 can be comprised between 1.5 ms and 2.5 ms, preferably 2 ms.

Alternatively, the portions of signals S1 and S2 can make up the primary pulse 210 in reverse order with respect to the order shown.

In other words, the second portion S2 can temporally precede the first portion S1.

The management device 3 is connected to the cable 2 in such a manner that the electrical signal S is propagated through the cable 2 itself.

Preferably, each one of the primary pulses 210 has a time duration ranging between 3 ms and 5 ms.

By way of example, the time duration of each primary pulse 210 may be substantially equal to circa 4 ms.

According to the invention, the primary pulses 210 are spaced at intervals having a time duration T3 ranging between 50 ms and 90 ms, preferably between 60 ms and 80 ms.

By way of example, each primary pulse 210 can consist of a plurality of sinusoidal waves, having alternating positive and negative signs according to the modulation used.

As is known, a sinusoidal signal does not include harmonics.

The technical effect achieved is the absence of interference with other machines located in the vicinity of the work zone.

Preferably, all the primary pulses 210 are substantially equal.

Advantageously, prior to propagating the electrical signal S through the cable 2, the management module 3 provides for carrying out a current limitation phase, so as to suitably define the amplitude and/or duration of the above-mentioned waves.

Advantageously, the lawn mower 1 further comprises sensor means 40 to detect the electrical signal S.

In this manner, when the lawn mower 1 is in the vicinity of the perimeter cable 2, it is capable of determining, as will become clearer herein below, whether it is inside or outside the cutting area A.

In one embodiment, the sensor means 40 can comprise an inductive element 41, as for example a coil, and a current scanner 42. Preferably, a current amplifier 43 is also provided, with the aim of permitting correct reading of the signal detected.

The lawn mower 1 further comprises an operative module 50, which is configured to perform several operations with the aim of processing and interpreting in a suitable manner the information supplied by the detected electrical signal S.

More specifically, the operative module 50 is configured to filter, in the electrical signal S, at least a first secondary pulse 211 in a first band of frequencies B1 defining the neighbourhood of the first frequency f1.

The operative module 50 is further configured to filter, in the electrical signal S, at least a second secondary pulse 212 in a second band of frequencies B2 defining the neighbourhood of the second frequency f2.

According to the invention, the second secondary pulse 212 is consecutive to the first secondary pulse 211.

According to the invention, the first secondary pulse 211 and the second secondary pulse 212 constitute the first primary pulse 210.

According to the invention, the operative module 50 is further configured to calculate the slope m of the electrical signal S at a reference instant t1.

The reference instant t1 is comprised between two consecutive points of equilibrium of the electrical signal S, which are identified in the first portion S1 and the second portion S2, respectively.

It is known that the points of equilibrium of a mathematical function are represented by the maximum and minimum points of the function itself and that a maximum point is defined as an unstable equilibrium point, whereas a minimum point is defined as a stable equilibrium point.

In the function that represents the electrical signal S, the reference instant t1 is comprised between a minimum (or maximum) point of the first portion S1 and a maximum (or minimum) point of the second portion S2, considering two consecutive maximum and minimum points, that is, not alternating with additional maximum or minimum points.

Expressed in other terms, the reference instant t1 is comprised in the temporal interval of the lower extreme t1−ΔT1/4 and upper extreme t1+ΔT2/4, considering T1 and T2, respectively, as periods of the first portion S1 and the second portion S2, of the signal S, as defined hereinabove.

Expressed in still other terms, the operative module 50 is configured to check the slope m of the electrical signal S at a change in frequency.

As mentioned previously, the change in frequency takes place in the transition from the first portion S1 of the signal S to the second portion S2 of the signal S or vice versa.

Expressed in still other terms, the operative module 50 is configured to calculate the first temporal derivative d/dt of said electrical signal S at a reference instant t1 comprised between two consecutive points of equilibrium of the electrical signal S, identified in the first portion S1 and in the second portion S2, respectively.

FIG. 6 illustrates the signal S' corresponding to the temporal derivative (or slope) S'(t) of the signal S(t) shown in FIG. 5.

In other words, $S'(t)=d/dt[S(t)]$.

In particular cases of operation of the apparatus, according to the invention, the reference instant t1 can be temporally identified between the first secondary pulse 211 and the second secondary pulse 212.

In other words, the reference instant t1 can be defined in the neighbourhood of the end instant of the first period T1 and the initial instant of the second period T2.

The lawn mower 1 further comprises a memory 60 in which the principal reference data Ref are stored. Preferably, the principal reference data Ref are representative of the fact that the lawn mower 1 is located inside the cutting area S.

In other words, the principal reference data Ref comprise an interval of slope values Δmi of the electrical signal S corresponding to a presence of the lawn mower 1 in the cutting area A.

The Δmi values, for example include only positive values. If the slope m is within the range of the Δmi values, then the lawn mower 1 is considered to be inside the cutting area A.

In other words, if m>0, then the lawn mower 1 is considered to be inside the cutting area A.

If the slope m has values differing from those in the range of the Δmi interval, then the lawn mower 1 is considered to be outside the cutting area A.

In other words, if m<0, then the lawn mower 1 is considered to be outside the cutting area A.

Expressed in still other words, the principal reference data Ref comprise values of the first temporal derivatives dj/dt of the electrical signal S corresponding to a presence of the lawn mower 1 in the cutting area A.

With reference to FIG. 5 (signal S(t)) and to FIG. 6 (signal S'=d/dt[S(t)]), for example, if the values of the temporal derivatives dj are such that dj/dt>0, then the lawn mower is considered to be inside the cutting area A.

Expressed in other terms, if the phase displacement of the electrical signal S is comprised between 0° and ∞, then the lawn mower is considered to be inside the cutting area A.

Alternatively, if the values of the temporal derivatives dj are such that dj<0, then the lawn mower is considered to be outside the cutting area A.

Expressed in other terms, if the phase displacement of the electrical signal S is comprised between −∞ and 0°, then the lawn mower is considered to be outside the cutting area A.

The lawn mower 1 further comprises a main comparison module 70 associated to the operative module 50 and to the memory 60.

The main comparison module 70 is configured to compare the slope m and the principal reference data Ref.

In other words, the main comparison module 70 is suitable for comparing the slope m and the slope values of the electrical signal S comprised in Δmi corresponding to a presence of the lawn mower 1 in the cutting area A.

Expressed in other terms, the main comparison module 70 is configured to compare the first temporal derivative d/dt and the principal reference data Ref.

The main comparison module 70 is, in other words, suitable for comparing the first temporal derivative d/dt and the values of the first temporal derivatives dj/dt of the electrical signal S corresponding to the presence of the lawn mower 1 in the cutting area A.

In more practical terms, the principal reference data Ref are those data that the main comparison module 70 "expects" to receive from the operative module 60 when the lawn mower 1 is located inside the cutting area A.

The main comparison module 70 is further configured to generate a corresponding notification signal Sout that is representative of the presence of the lawn mower 1 inside or outside said cutting area A.

Therefore, for example, if the main comparison module 70 finds a slope value m comprised in Δmi, then the notification signal Sout will be representative of the fact that the lawn mower 1 is located inside the cutting area A (position P1 in FIG. 3).

Expressed in other terms, if the main comparison module 70 finds a value of the first derivative d/dt>0, then the notification signal Sout will be representative of the fact that the lawn mower 1 is located inside the cutting area A (position P1 in FIG. 3).

Vice versa, if the main comparison module 70 finds a slope value m that is external to the Δmi interval, then the notification signal Sout will be representative of the fact that the lawn mower 1 is located outside the cutting area A (position P2 in FIG. 3).

Expressed in other terms, if the main comparison module 70 finds a value of the first temporal derivative d/dt<0, then the notification signal Sout will be representative of the fact that the lawn mower 1 is located outside the cutting area A (position P2 in FIG. 3).

The lawn mower 1 further comprises a command unit 80 that is connected to the main comparison module 70 to command the movement means 20 based on the notification signal Sout.

The command unit 80 thus has the task of directing the movement of the lawn mower 1 based on whether the lawn mower is located inside or outside the cutting area A.

More specifically, in the event that the lawn mower 1 is located outside the cutting area A, the command unit 80 would command the movement means 20 (preferably consisting, as stated, of the wheels 20a and the relative motors) in such a manner that the lawn mower 1 would return back inside the cutting area A.

In one embodiment, the command unit 80 can also be operatively active on the cited blades 30, so as to regulate the functioning of the latter as well, according to the position of the lawn mower 1.

For example, in the case in which the lawn mower 1 is located outside the cutting area S, the blades 30 can be deactivated, thereby reducing electrical power consumption and preventing possible damage to the blades themselves.

As stated, the primary pulses 210 are all substantially equal to each other and alternating with periods with an absence of signals.

In other words, the management device 3 provides for the propagation through the perimeter cable 2 of the same information continually, alternated with periods of "silence". The functioning of the apparatus of this invention can be deduced from the description provided.

The lawn mower 1 moves within the cutting area A, which is delimited by the perimeter cable 2.

The management device 3 is in charge of generating the sinusoidal signal S that comprises primary pulses 210 made up of a first portion S1 at a frequency of 8 Khz and a second portion S2 at a frequency of 4 Khz consecutive to the first one.

During its movement within the cutting area A, if the lawn mower nears the boundary delimiting that area, the sensor means 40 detect the presence of the perimeter cable 2 by detecting the signal S passing through it.

The operative module 50 of the apparatus detects the sequence of the portions S1 and S2 of the signal S at the different frequencies and calculates the slope of the signal (temporal derivative) between two consecutive points of equilibrium of the signal S.

If the comparison module 70 detects a positive slope m (first temporal derivative d/dt>0), this means, for example, that the lawn mower is still inside the cutting area A; in this case, the command unit commands the movement means accordingly in a first operative mode.

For example, the lawn mower 1 is controlled in such a manner as to continue along the previously defined path.

If the comparison module 70 calculates the slope m to be negative (value of the first temporal derivative d/dt>0), this means, for example, that the lawn mower is outside the cutting area A; in this case, the command unit 80 commands the movement means accordingly, for example, in a second operative mode.

For example, the lawn mower 1 is controlled in such a manner as to change its course of direction, making a turn at a predefined angle, or in a manner that reverses its direction in order to return back inside the cutting area A or to straddle the perimeter cable 2; several possible motions for the re-entry of a lawn mower from an external zone into a cutting area are known in the literature.

Note that the various functional elements described above (operative module 50, main comparison module 70, command unit 80) have been presented separately for the sole purpose of rendering the functioning of the apparatus 100, and particularly of the lawn mower 1, as clear as possible 100.

In practice, these functional elements can also be realized with a single electronic device, such as a microprocessor, which is suitably programmed for performing the operations described and claimed herein.

The invention claimed is:

1. An apparatus for cutting grass comprising:
 a lawn mower equipped with: movement means for movement of said lawn mower at least inside a cutting area (A); one or more blades for cutting grass in said cutting area (A);
 an electrical cable, delimiting said cutting area (A);
 a management device, associated to said cable and configured to supply an output electrical signal (S), comprising a plurality of primary pulses consisting of:
  a first, substantially periodic portion (S1) of a first period (T1) and first frequency (f1);
  a second, substantially periodic portion (S2) of a second period (T2) and second frequency (f2);
 wherein said electrical signal (S) and said first and second portions (S1, S2) comprise alternating sinusoidal signals;
 said management device being connected to said cable in order to make said electrical signal (S) to propagate through said cable;
 said lawn mower being further equipped with:
  a sensor means to detect said electrical signal (S);
  an operative module configured to:
   filter, in said electrical signal (S), at least a first secondary pulse in a first band of frequencies (B1), defining a neighbourhood of said first frequency (f1);
   filter, in said electrical signal (S), at least a second secondary pulse in a second band of frequencies (B2), defining a neighbourhood of said second frequency (f2), said second secondary pulse being consecutive to said first secondary pulse, said first secondary pulse and second secondary pulse constituting said primary pulse;
   calculate the slope (m) of said electrical signal (S) at a reference instant (t1) comprised between two consecutive points of equilibrium of said electrical signal (S), which are identified in said first portion (S1) and said second portion (S2), respectively;
  wherein in a function that represents the electrical signal S, the reference instant (t1) is between a minimum point of the first portion (S1) and a maximum point of the second portion (S2), or a maximum point of the first portion (S1) and a minimum point of the second portion (S2), considering two consecutive maximum and minimum points;
  a memory, containing principal reference data (Ref) comprising an interval of slope values (Δmi) of said electrical signal (S), which correspond to a presence of said lawn mower in said cutting area (A);
  a comparison module, associated to said operative module and to said memory, configured to:
   compare said slope (m) and said principal reference data (Ref),
   generate a corresponding notification signal (Sout) that is representative of the presence of said lawn mower inside or outside said cutting area (A);
  a command unit that is connected to said main comparison module, to command said movement means based on said notification signal (Sout).

2. The apparatus according to claim 1, wherein said operative module is configured to control the slope (m) of said electrical signal (S) at a change in frequency.

3. The apparatus according to claim 1, wherein said command unit commands said movement means in a first operative mode if said comparison module detects a positive slope (m).

4. The apparatus according to claim 1, wherein said command unit commands said movement means in a second operative mode if said comparison module detects that said slope (m) is negative.

5. The apparatus according to claim 1, wherein said operative module is configured to calculate the first temporal derivative (d/dt) of said electrical signal (S) at a reference instant (t1) comprised between two consecutive points of equilibrium of said electrical signal (S), which are identified in said first portion (S1) and in said second portion (S2), respectively.

6. The apparatus according to claim 1 wherein said sensor means comprises an inductive element and a current scanner.

7. The apparatus according to claim 1 wherein said first frequency (f1) is comprised between 7.5 KHz and 8.5 KHz, preferably 8 KHz.

8. The apparatus according to claim 7, wherein said first frequency (f1) is 8 KHz.

9. The apparatus according to claim 1 wherein said second frequency (f2) is comprised between 3.5 KHz and 4.5 KHz, preferably 4 KHz.

10. The apparatus according to claim 9, wherein said second frequency (f2) is 4 KHz.

11. The apparatus according to claim 1, wherein said management device is configured to supply said output electrical signal (S), comprising a plurality of primary pulses spaced temporally apart from each other.

\* \* \* \* \*